No. 655,436. Patented Aug. 7, 1900.
J. Z. FORMEL.
APPARATUS FOR PURIFYING NATURAL MINERAL WATERS.
(Application filed Feb. 17, 1899.)
(No Model.)
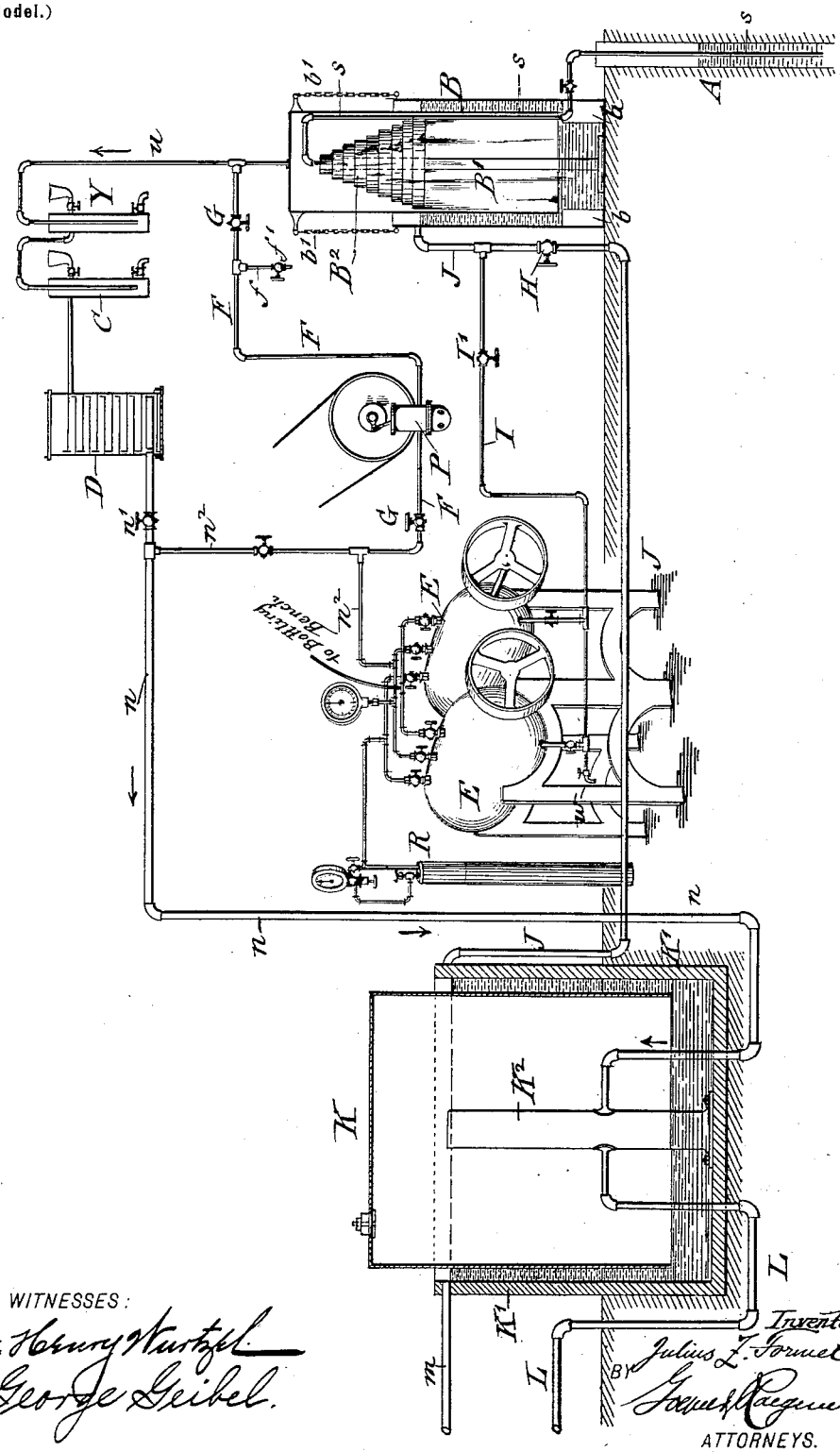
WITNESSES:
M. Henry Wurtzel
George Geibel.
Inventor
Julius Z. Formel
BY
ATTORNEYS.

UNITED STATES PATENT OFFICE.

JULIUS Z. FORMEL, OF SARATOGA SPRINGS, NEW YORK.

APPARATUS FOR PURIFYING NATURAL MINERAL WATERS.

SPECIFICATION forming part of Letters Patent No. 655,436, dated August 7, 1900.

Application filed February 17, 1899. Serial No. 705,756. (No model.)

*To all whom it may concern:*

Be it known that I, JULIUS Z. FORMEL, a citizen of the United States, residing in Saratoga Springs, in the county of Saratoga and State of New York, have invented certain new and useful Improvements in Apparatus for Purifying Natural Mineral Waters, of which the following is a specification.

This invention relates to an improved apparatus for purifying natural mineral waters, and especially such natural mineral waters as contain, besides carbonic-acid gas, other objectionable gases, such as sulfureted hydrogen or similar gases, which are contained in the water when it is bottled, but which are noticeable when they are consumed some time after bottling and by which the general sale and consumption of these mineral waters is considerably impaired.

The invention consists of an apparatus for purifying natural mineral waters which comprises a separator for the water and carbonic-acid gas contained therein, means for supplying the mineral water to said separator, purifiers for the carbonic-acid gas, a gasometer for the purified gas, mixing-fountains, a pipe connecting the mixing-fountains with the water-space of the separator at a point above the level of said fountains, a pipe connecting said purifiers with the gasometer, means for supplying the purified carbonic-acid gas to said mixing-fountains, and a discharge-pipe connected with the mixing-fountains for drawing off the purified water.

The invention consists, further, in means for connecting the mixing-fountains with the purifiers, so as to conduct the gas from the mixing-fountains into the purifiers, and, further, in the special construction of the separator.

The accompanying drawing is a side view, partly in section, of my improved apparatus.

In utilizing the natural mineral waters containing carbonic-acid gas the wells from which the water is pumped are under different pressures. Some of them come up to the surface with great force, while most of them, however, do not, in which case a pump (not shown in the drawings) has to be used to draw up the water from the well. The pump is provided with a suction-pipe $s$, that extends down to the level of the water of the well. In place of a pump an injector or other forcing apparatus may be used, by which the water is lifted from the well A. The suction-pipe $s$ is conducted into an apparatus B, which may be denominated a "separator" and which is constructed in the nature of a gas-drum, with a stationary exterior cylinder open at the upper end and an interior drum that is closed at the upper end and open at the lower end. The outer cylinder is provided at its base with four wooden blocks $b$, on which the inner cylinder is supported. The inner drum is connected with the outer cylinder by means of chains $b'$, so that it remains stationary and is prevented from rising. On a central standard $B'$ at the interior of the separator B is supported a series of step-shaped shelves $B^2$, which gradually increase in diameter, and hence in evaporative surface, from the upper to the lower shelf, as shown. The water from the well is discharged by the suction-pipe $s$ on the uppermost shelf and falls from shelf to shelf until it finally fills the lower part of the outer cylinder B. By the action of the pump the level of the water in the well rises and falls, so that alternately gas and water are delivered by the action of the pump. When the water gets below the reach of the pump, the vacuum created above the water by the suction action of the pump will separate the carbonic-acid gas from the water, as the same is lighter than water, so that the pump will discharge only carbonic-acid gas until the water rises again within reach of the suction-pipe of the pump. The gas which is discharged by the suction-pipe $s$ is drawn off through a pipe $u$ that is connected with the top or gas-space of the separator B and passed, first, through a purifier Y, which is filled with a solution of potassium permanganate in distilled water and then through a second purifier C, made of lead and containing sulfuric acid of about 66° Baumé, so that the carbonic gas is thoroughly dried for facilitating its liquefaction. From this second purifier the gas is drawn to a purifier D, which is composed of shelves attached alternately to opposite walls of the purifier, said shelves being charged alternately with calcium carbonate, charcoal, calcium chlorid, and hydrated sesquioxid of iron and lime, by which the final drying and purifying of the gas is produced. From the lower part of the purifier D the purified carbonic-acid gas passes to the gasometer K by a pipe $n$. A check-valve $n'$ is provided in the pipe $n$ so as to prevent any back pressure of the gas. The gasometer K is constructed in the usual manner of a drum open at the lower end and sealed hydraulically in the usual manner, the water for sealing the drum being supplied from the separator B by an overflow-pipe J, which is provided with a stop-cock H. The exterior tank K' of the gasometer K is provided with an overflow-pipe $m$, while the interior central stand-pipe $K^2$ is connected by a pipe L with the compressor by which the carbonic-acid gas is liquefied. The overflow-pipe J, which is connected with the water-space of the separator at a point above the level of the mixing-fountains, as shown in the drawing, is connected above the stop-cock H by a pipe I with the mixing-fountains E in which the water is mixed with carbonic-acid gas preparatory to bottling. The water is held under vacuum in said fountains for about ten minutes for removing the air in the same, after which it is charged with purified carbonic-acid gas under pressure of about forty-five to fifty pounds, which is either supplied directly from the pipe $n$ by means of a pipe $n^2$ or from a cylinder R containing liquid carbonic acid. A pressure-gage is arranged on the cylinder R and a vacuum-gage above the mixing-fountains. When the water is bottled from the mixing-fountains, the stop-cock H is closed and the stop-cock I' of the pipe is opened; but when no water is bottled the stop-cock I' is closed and the stop-cock H in the overflow-pipe J is opened, so that the water can flow into the gasometer K and pass off through the overflow-pipe $m$. The water is alternately charged into the fountains and subjected in the same to a vacuum for about ten minutes, so as to remove the air, as before stated, which is detrimental, as it affects the solubility of the bicarbonates contained therein and changes them into insoluble carbonates. When the air is removed, the chemical changes which take place in all mineral waters containing bicarbonate, &c., in solution will be obviated. In case liquefied carbonic-acid gas is not conveniently at hand the water can be mixed in the fountains by means of a small force-pump, which serves to draw the carbonic-acid gas from the gasometer K. By properly closing and opening the stop-cocks of the fountains E one fountain can be used for bottling, while the other is subjected to the vacuum and charging process. Whenever one fountain is empty, the stop-cock in the pipe leading from the empty fountain to the pipe $n^2$ is opened in order to move the gas contained therein. This gas is returned into the gasometer K, after which the empty fountain is filled with water through the pipes J and I. The fountains E can be emptied for the night after their contents are bottled by opening the cock $w$.

As the water supplied by the pipes J and I to the mixing-fountains contains carbonic-acid gas, air, and sulfureted hydrogen, these gases have to be liberated from the water by the action of the vacuum produced by the vacuum-pump P and conducted through the pipe F, provided with stop-cocks G, to the purifiers, or they are discharged through the branch pipe $f$, having a stop-cock $f'$, directly into the atmosphere, the stop-cock G, near the pipe $f$, being then closed. This is done when more carbonic-acid gas is supplied by the well than is required for charging the water for bottling or for liquefying it, as in this case it is not necessary to save the carbonic-acid gas liberated from the water by the vacuum-pump.

When an injector is used for taking the water from the well and discharging it into the separator B, the live steam which is used for operating the injector serves for heating the water that is supplied to the step-shaped shelf-separator and for raising it to a temperature of from 48° to 70°. By thus heating the water almost every trace of carbonic-acid gas in the same will be liberated, so that the vacuum-pump is hardly necessary. The use of an injector has therefore a twofold advantage of increasing the volume of water and carbonic-acid gas drawn from the well and of liberating the carbonic-acid gas from the water which is discharged into the separator. The overflow from the outer cylinder of the separator is located at a higher level than the mixing-fountains E, so that the water can be run directly into the fountains whenever they are to be filled and subjected to the action of the vacuum.

By the process and apparatus herein described the carbonic-acid gas contained in natural mineral waters can be purified, dried, and deodorized and these waters then recharged with the purified gas so that the objections heretofore raised against many springs of natural mineral waters are removed and the waters rendered permanently marketable.

Having thus described my invention, I claim as new and desire to secure by Letters Patent—

1. The apparatus herein described for purifying natural mineral waters, which consists of a separator for the water and carbonic-acid gas contained therein, means for supplying the mineral water to said separator, purifiers for the carbonic-acid gas, a gasometer for the purified gas, mixing-fountains, a pipe connecting the mixing-fountains with the water-space of the separator at a point above the level of said fountains, a pipe connecting the gas-space of the separator with the purifiers, a pipe connecting said purifiers with the gasometer, means for supplying the purified carbonic-acid gas to said mixing-fountains, and a discharge-pipe connected with the mixing-fountains for drawing off the purified water, substantially as set forth.

2. The apparatus herein described for purifying natural mineral waters, which consists of a separator for the water and carbonic-acid gas contained therein, means for supplying the mineral water to said separator, purifiers for the carbonic-acid gas, a gasometer for the purified gas, mixing-fountains, a pipe connecting the mixing-fountains with the water-space of the separator, a pipe connecting the gas-space of the separator with the purifiers, a pipe connecting said purifiers with the gasometer, means for supplying the purified carbonic-acid gas to said mixing-fountains, a pipe connecting the mixing-fountains above their liquid-level, with the purifiers, and a discharge-pipe connected with the mixing-fountains for drawing off the purified water, substantially as set forth.

3. The apparatus herein described for purifying natural mineral waters, which consists of a separator for the water and carbonic-acid gas contained therein, means for supplying the mineral water to said separator, purifiers for the carbonic-acid gas, a gasometer for the purified gas, mixing-fountains, a pipe connecting the mixing-fountains with the water-space of the separator, a pipe connecting the gas-space of the separator with the purifiers, a pipe connecting said purifiers with the gasometer, means for supplying the purified carbonic-acid gas to said mixing-fountains, a vacuum-pump, a pipe connecting the mixing-fountains, above their liquid-level, with the vacuum-pump, a pipe connecting said vacuum-pump with the purifiers, and a discharge-pipe connected with the mixing-fountains for drawing off the purified water, substantially as set forth.

4. In an apparatus for purifying natural mineral waters, a separator, consisting of an outer drum open at its upper end, an inner drum water-sealed in the outer drum, a series of shelves supported in said inner drum, said shelves being of increasing surface from the uppermost to the lowermost shelf, and means for discharging the mineral water upon the uppermost of said shelves, substantially as set forth.

In testimony that I claim the foregoing as my invention I have signed my name in presence of two subscribing witnesses.

JULIUS Z. FORMEL.

Witnesses:
GEO. BLOOM,
A. G. WARRINER.